Feb. 2, 1954 P. W. WARD ET AL 2,668,248

PULSE WIDENING APPARATUS

Filed Dec. 11, 1952

INVENTORS
PETER WILLIAM WARD
DONALD FRANCIS BOWMAN
BY
[signature]
ATTORNEY

Patented Feb. 2, 1954

2,668,248

UNITED STATES PATENT OFFICE 2,668,248

PULSE WIDENING APPARATUS

Peter William Ward, Wembley, and Donald Francis Bowman, Hendon, London, England, assignors to The General Electric Company Limited, London, England, a British company Application December 11, 1952, Serial No. 325,468

Claims priority, application Great Britain October 30, 1952

8 Claims. (Cl. 307—107)

Figure 2:
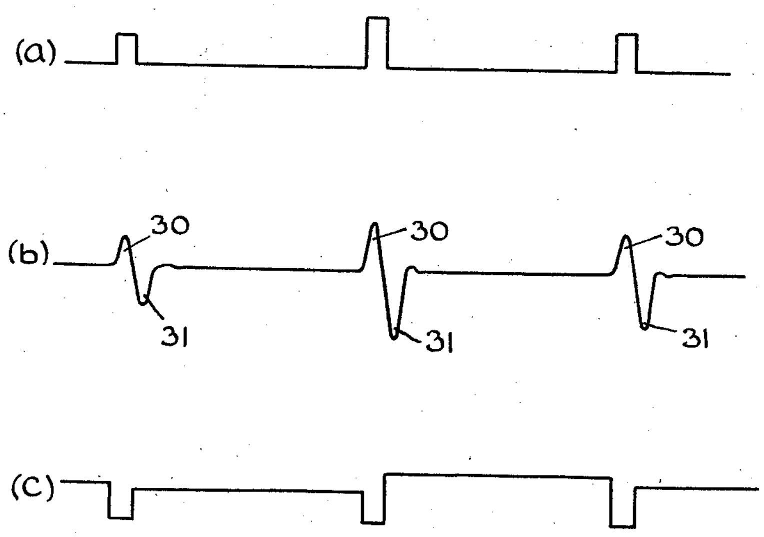

The present invention relates to pulse lengthening apparatus, for use in increasing the duration of the pulses of a train of electrical pulses of varying amplitude and having a duration short in comparison with the time intervals between them. Such apparatus is often included for example in the receivers of multichannel pulse signalling systems, one apparatus being included in the demodulating equipment for each channel, to increase the duration and hence the energy content of an amplitude modulated pulse train associated with the channel before application to a low pass filter for demodulation.

It is an object of the present invention to provide relatively simple pulse lengthening apparatus for use in increasing the duration of the pulses of a train of electrical pulses of varying amplitude and having a duration short in comparison with the time intervals between them.

It is a further object of the present invention to provide improvements in equipment for demodulating amplitude modulated electric pulse trains.

According to the present invention pulse lengthening apparatus for use in increasing the duration of the pulses of a train of electrical pulses of varying amplitude and constant polarity and having a duration short in comparison with the time intervals between them includes, a pulse transformer having a primary winding and two secondary windings, an input circuit including means responsive to an input train of unidirectional amplitude modulated pulses for passing a train of correspondingly modulated current pulses of substantially uniform duration through the primary winding of the transformer, a capacitance and a resistance each connected in parallel with the primary winding, the magnitude of the capacitance and the resistance being such that the natural period of the parallel resonant circuit so formed is approximately equal to twice the duration of the current pulses and the decrement of the circuit is high, a further capacitance, means for maintaining one side of the further capacitance at a fixed potential, a source of two reference potentials differing by at least the maximum output pulse potential, means connected to the first secondary winding for restricting potential variations on the other side of the further capacitance to the range defined by the two reference potentials and responsive to voltage changes across the first secondary winding, occurring in consequence of the leading edge of one of said current pulses passing in the primary winding, for bringing the potential on the said other side of the further capacitance to one of the two reference potentials, means connected to the other secondary winding responsive to voltage changes across it occurring in consequence of the trailing edge of one of said current pulses passing in the primary winding, for bringing the potential on the said other side of the further capacitance towards the other of the two reference potentials by an amount proportional to the amplitude of the pulse, the coupling of the said other secondary winding to the primary winding being such that the voltage changes across it are not greater than the difference between the two reference potentials, and means for deriving an output pulse train from the voltage across the further capacitance.

The said means connected to the first secondary winding may include, means connecting one end of the winding to a point at one of the two reference potentials in operation, the one end being chosen so that on passage of the leading edge of a current pulse through the primary winding the other end will swing towards the other of the two reference potentials, a first rectifying device connected to the other end of the secondary winding and to a point at the other of the two reference potentials in operation, the polarity of the rectifying device being arranged so that the other end of the secondary winding cannot swing substantially beyond the other of the two reference potentials, a chain comprising a second rectifying device, a resistance and a third rectifying device in series in that order, connected in parallel with the first rectifying device, the polarities of the second and third rectifying devices being the same as that of the first, and means connecting the said other side of the further capacitance to the common terminal of the resistance and the third rectifying means.

The said means connected to the second secondary winding may include, means connecting one end of the winding to a point, in operation, at the other of the two reference potentials, the end being chosen so that the passage of the trailing edge of a current pulse through the primary winding the other end will swing towards the first reference potential, and a rectifying device connecting the other end of the winding to the said other side of the further capacitance, the polarity of the rectifying device being arranged so that it becomes conducting when the said other end of the second secondary winding is at a potential nearer the one reference potential than the potential of the other side of the further capacitance.

Preferably the rectifying devices are germanium crystal rectifiers. The fixed potential of the one side of the further capacitance and one of the two reference potentials may conveniently be the same potential, which may be earth potential.

According to a feature of the present invention equipment for demodulating a train of amplitude modulated electric pulses having a duration short compared with the intervals between them may include pulse lengthening apparatus in accordance with the present invention for use in increasing the duration of pulses of the said train, an output pulse train derived from the said apparatus being applied in operation to a low pass filter having a pass band extending substantially up to the maximum frequency of the signal frequency band.

Figure 1:
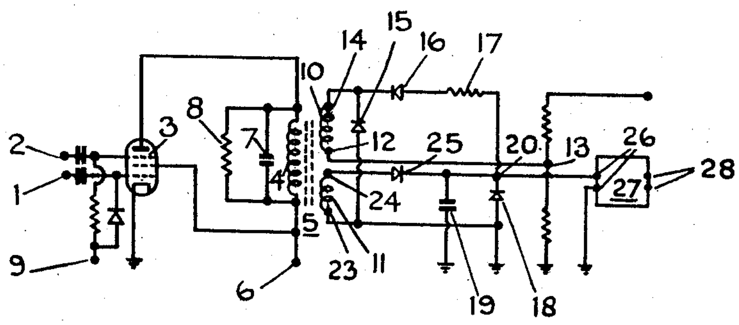

One example of pulse lengthening apparatus in accordance with the present invention for use in a multichannel pulse amplitude modulation telephony system will now be described with reference to the accompanying drawings in which, Figure 1 shows a circuit diagram of the apparatus and part of a gating circuit which forms the preceding stage in the system, and Figures 2 (*a*), (*b*) and (*c*) show waveforms illustrating the operation of the apparatus.

Referring now to Figure 1 of the accompanying drawings, a multichannel pulse train comprising interleaved amplitude modulated pulse trains of all the channels of the system, as applied between the input terminal 1 and earth. The pulses are all positive-going and have a duration short compared with the intervals between them. The apparatus of which the circuit diagram is shown is associated mainly with only one channel of the system, say channel No. 1, and recurrent gating pulses, which are also positive-going, defining the intervals of channel No. 1 are applied between the terminal 2 and earth. The gating pulses are generated in a channel distributor which may be of any suitable form, for example a delay line distributor.

The input terminal 1 is connected to the control grid of a pentode thermionic valve 3, and the terminal 2 is connected to the suppressor grid of the same pentode 3. The pentode 3 is arranged in conventional manner as a gating circuit, that is it is biased by a negative voltage applied at terminal 9 so that it will only pass current when pulses are applied simultaneously to the control and suppressor grids. In this way a current pulse flows in the pentode 3 only when a pulse of channel No. 1 is applied at the input terminal 1, for only then will there simultaneously be a gating pulse applied at terminal 2.

The primary winding 4 of a pulse transformer 5 is connected between the anode of the pentode 3 and a terminal 6, to which in operation a positive high tension voltage is applied. The screen grid of the pentode 3 is also connected to the terminal 6. A capacitance 7 and a resistance 8 are each connected in parallel with the primary winding 4. The value of the capacitance 7 is chosen so that the natural period of the parallel resonant circuit so formed is approximately equal to twice the duration of the channel pulses applied to the input terminal 1. The value of the resistance 8 is chosen so that the decrement of the circuit is high, and any oscillations excited in it are consequently heavily damped.

The pulse transformer 5 has two secondary windings 10 and 11, the secondary winding 10 having a greater number of turns than the secondary winding 11. One terminal 12 of the secondary winding 10 is connected directly to a terminal 13 on a potentiometer chain connected across a point maintained in operation at a positive potential and earth, the terminal 13 being maintained in operation at a potential a few volts positive with respect to earth, for example 5 volts. Two connections are made to the other terminal 14 of the secondary winding 10. One is to the negative pole of a germanium crystal rectifier 15, the positive pole of which is connected to earth and the other is connected to the negative pole of a germanium crystal rectifier 16 the positive pole of which is connected to one end of a resistance 17, the other end of which is connected to the negative pole of a germanium crystal rectifier 18. The positive pole of the rectifier 18 is earthed. (N. B. The terms "positive pole" and "negative pole" are used in the sense of the poles to which and from which electrons flow respectively.)

The capacitance 19 is connected across the negative pole of the rectifier 18 and earth and the output terminals of the apparatus are connected to the terminal 20 and earth, i. e. across the capacitance 19.

One terminal 23 of the secondary winding 11 is earthed and the other terminal 24 is connected to the positive pole of the germanium crystal rectifier 25. The negative pole of the rectifier 25 is connected to the common terminal of the capacitance 19 and the rectifier 18.

The output terminal 20 is connected to one of the input terminals 26 of a low pass filter circuit 27, having a pass band extending up to the maximum frequency of the signal frequency band of channel 1. It is important that the circuit 27 should be arranged to have a high input resistance. A signal utilisation means (not shown in the drawing) for example a loudspeaker, is connected across the output terminals 28 of the low pass filter circuit 27. The circuit 27 may include at least one thermionic valve amplifier stage.

The operation of the apparatus described with reference to Figure 1 of the accompanying drawings will now be described with reference to Figures 2(*a*)–(*c*). Figure 2(*a*) shows the amplitude modulated current pulses which are passed through the pentode 3. These are applied to the parallel resonant circuit made up by the primary winding 4, the capacitance 7 and the resistance 8, and shock excite it into oscillation. The natural period of the parallel resonant circuit is approximately equal to twice the duration of the applied pulses and the resistance 8 is chosen so that the circuit is heavily damped. In consequence each pulse applied causes an oscillation across the primary winding of a form illustrated in Figure 2(*b*). Each oscillation includes a peak 30 of the same polarity as the applied pulse and of an amplitude proportional to that of the pulse, followed on the occurrence of the trailing edge of the applied pulse, by a peak 31 of the opposite polarity, again proportional in amplitude to that of the pulse. The second peak 31 has a greater amplitude than the first, and as the circuit is highly damped the amplitude of the oscillation decreases rapidly after the second half cycle.

Assume that initially the free side of the capacitance 19 is at a potential between earth and that of the terminal 13, when the leading edge of a current pulse is applied to the primary winding 4. (It will be seen below that this condition always holds in operation.) During the peak 30 of each damped oscillation the terminals 14 and 24 of the secondary windings 10 and 11 respectively swing negative with respect to the terminals 12 and 23 which are at fixed potentials. Terminal 24 swinging negative with respect to terminal 23 has no effect since the rectifier 25 is non-conducting. Terminal 14 however can only swing negative until the rectifier 15, the positive pole of which is earthed, becomes conducting. During this process the rectifier 16 also becomes conducting and the capacitance 19 is discharged through the resistance 17 and the rectifier 16. Simultaneously the rectifier 18 becomes conducting, and the discharge of the capacitance 19 ceases when the voltage across it is slightly negative with respect to earth.

During the second peak 31 of each oscillation, as shown in Figure 2(*b*), terminals 14 and 24 of the windings 10 and 11 respectively swing positive with respect to the terminals 23. Terminal 14 swinging positive has no effect as neither of the rectifiers 15 and 16 can conduct. When terminal 24 swings positive the rectifier 25 becomes conducting and the capacitance 19 is charged to a positive voltage between that of the terminal 13 and earth (since the winding 11 has fewer turns that the winding 10), proportional to the amplitude of the current pulse passing through the primary winding 4 of the transformer 5. The voltage variations across the capacitance 19 corresponding to the current pulses of Figure 2(*a*) are shown in Figure 2(*c*). It will be seen that the voltage is reduced to a datum level for a short time during each of the pulses of Figure 2(*a*), and then rises to a value proportional to the amplitude of the corresponding pulse, at which the voltage remains until it returns to the datum value during the next pulse. The voltage variations across the capacitance 19 are effectively a train of broad amplitude modulated pulses, which appear across the output terminals 20. These are applied to the input terminals 26 of the low pass filter 27, the output across the terminals 28 of which is the modulation component of the pulse train of Figure 2(*c*).

In one system in which apparatus such as that described above has been employed, the number of channels is ten, the pulse repetition frequency in one channel being 8 kc./s., the pulse duration 10 micro-seconds, and the gating pulse duration 12.5 micro-seconds. The amplitude of the gating pulses applied to terminal 2, is approximately 30 volts and that of the signal pulses applied to terminal 1, 3–4 volts with a thirty per cent amplitude modulation. The amplitude of the current pulses passed through the primary winding 4 of the transformer 5 is of the order of 10 milliamps.

The inductance of the primary winding 4 was approximately 80 millihenries, the capacitance 7 being 220 picofarads, giving a resonant frequency of approximately 40 kc./s. The corresponding period is 25 micro-seconds rather more than twice the signal pulse length. The damping resistance 8 was 47 kilohms. The primary winding 4 has 800 turns, the secondary winding 10, 250 turns and the secondary winding 11, 150 turns, the windings being closely coupled. In practice a damping resistance of 2200 ohms had to be connected across the winding 10 to offset a tendency for it to ring, and this contributed to the damping of the primary circuit. The capacitance 19 is 0.002 microfarad, and terminal 13 is about 6 volts positive with respect to earth.

The circuit may be modified slightly in a number of ways. For example provided terminal 13 is approximately six volts positive with respect to the terminal 23 of the winding 11, it is not important at what potential they shall be relative to earth, provided that the potential across the capacitance 19 is not unduly high. It is often convenient that one or more of these terminals shall be at earth potential, and that will normally be the case. The arrangement with terminal 23 earthed is shown in Figure 1. The alternative arrangement (not shown in the drawing) with terminal 13 earthed and terminal 23 at a negative potential is convenient for example where the low pass filter circuit 27 includes a single tuned amplifier stage, biased to operate in the absence of input pulses in the class C condition, the control grid of the amplifier valve which is coupled to the terminal 20 having a conventional D. C. restoration circuit connected to it, clamping it to the same negative potential as the terminal 23 i. e. about 6 volts negative. The pulses applied to the control grid then lift the grid potential to a level on the linear part of the valve characteristic. The anode circuit of the amplifier includes a transformer, the output being taken from across the second winding.

The circuit will also operate satisfactorily if one of the rectifiers 15 or 18 is omitted, but it is preferable for optimum performance that both should be included.

We claim:

1. Pulse lengthening apparatus for use in increasing the duration of the pulses of a train of electrical pulses of varying amplitude and constant polarity and having a duration short in comparison with the time intervals between them including, a pulse transformer having a primary winding and two secondary windings, an input circuit including means responsive to an input train of unidirectional amplitude modulated pulses for passing a train of correspondingly modulated current pulses of substantially uniform duration through the primary winding of the transformer, a capacitance and a resistance each connected in parallel with the primary winding, the magnitude of the capacitance and the resistance being such that the natural period of the parallel resonant circuit so formed is approximately equal to twice the duration of the current pulses and the decrement of the circuit is high, a further capacitance, means for maintaining one side of the further capacitance at a fixed potential, a source of two reference potentials differing by at least the maximum output potential, means connected to the first secondary winding for restricting potential variations on the other side of the further capacitance to the range defined by the two reference potentials and responsive to voltage changes across the first secondary winding, occurring in consequence of the leading edge of one of said current pulses passing in the primary winding, for bringing the potential on the said other side of the further capacitance to one of the two reference potentials, means connected to the other secondary winding responsive to voltage changes across it occurring in consequence of the trailing edge of one of said current pulses passing in the primary winding, for bringing the potential on the said other side of the further capacitance towards the other of the two reference potentials by an amount proportional to the amplitude of the pulse, the coupling of the said other secondary winding to the primary winding being such that the voltage changes across it are not greater than the difference between the two reference potentials, and means for deriving an output pulse train from the voltage across the further capacitance.

2. Pulse lengthening apparatus according to claim 1 in which said means connected to the first secondary winding includes, means connecting one end of the winding to a point at one of the two reference potentials in operation, the one end being chosen so that on passage of the leading edge of a current pulse through the primary winding the other end will swing towards the other of the two reference potentials, a first rectifying device connected to the other end of the secondary winding and to a point at the other of the two reference potentials in operation, the polarity of the rectifying device being arranged so that the other end of the secondary winding cannot swing substantially beyond the other of the two reference potentials, a chain comprising a second rectifying device, a resistance and a third rectifying device in series in that order, connected in parallel with the first rectifying device, the polarities of the second and third rectifying devices being the same as that of the first, and means connecting the said other side of the further capacitance to the common terminal of the resistance and the third rectifying means.

3. Pulse lengthening apparatus according to claim 2 in which the rectifying devices are germanium crystal rectifiers.

4. Pulse lengthening apparatus according to claim 1 in which said means connected to the second secondary winding includes, means connecting one end of the winding to a point, in operation, at the other of the two reference potentials, the end being chosen so that the passage of the trailing edge of a current pulse through the primary winding the other end will swing towards the first reference potential, and a rectifying device connecting the other end of the winding to the said other side of the further capacitance, the polarity of the rectifying device being arranged so that it becomes conducting when the said other end of the second secondary winding is at a potential nearer the one reference potential than the potential of the other side of the further capacitance.

5. Pulse lengthening apparatus according to claim 4 in which the rectifying devices are germanium crystal rectifiers.

6. Pulse lengthening apparatus according to claim 1 in which one of the reference potentials and the fixed potential of the one side of the further capacitance are equal.

7. Pulse lengthening apparatus according to claim 6 in which said equal potentials are earth potential.

8. Equipment for demodulating a train of amplitude modulated electric pulses having a duration short compared with the intervals between them including a pulse transformer having a primary winding and two secondary windings, an input circuit including means responsive to an input train of unidirectional amplitude modulated pulses for passing a train of correspondingly modulated current pulses of substantially uniform duration through the primary winding of the transformer, a capacitance and a resistance each connected in parallel with the primary winding, the magnitude of the capacitance and the resistance being such that the natural period of the parallel resonant circuit so formed is approximately equal to twice the duration of the current pulses and the decrement of the circuit is high, a further capacitance, means for maintaining one side of the further capacitance at a fixed potential, a source of two reference potentials differing by at least the maximum output potential, means connected to the first secondary winding for restricting potential variations on the other side of the further capacitance to the range defined by the two reference potentials and responsive to voltage changes across the first secondary winding, occurring in consequence of the leading edge of one of said current pulses passing in the primary winding, for bringing the potential on the said other side of the further capacitance to one of the two reference potentials, means connected to the other secondary winding responsive to voltage changes across it occurring in consequence of the trailing edge of one of said current pulses passing in the primary winding, for bringing the potential on the said other side of the further capacitance towards the other of the two reference potentials by an amount proportional to the amplitude of the pulse, the coupling of the said other secondary winding to the primary winding being such that the voltage changes across it are not greater than the difference between the two reference potentials, a low pass filter having a pair of input terminals and a pair of output terminals and having a pass band extending substantially up to the maximum frequency component of the signal with which said pulse train is modulated, means coupling the input terminals of the filter across the terminals of the further capacitance, and signal output terminals coupled to the output of the filter.

PETER WILLIAM WARD.
DONALD FRANCIS BOWMAN.

No references cited.